US006255745B1

(12) United States Patent

Bertsch et al.

(10) Patent No.: US 6,255,745 B1
(45) Date of Patent: Jul. 3, 2001

(54) ARRANGEMENT FOR FREQUENCY-SELECTIVE SUPPRESSION OF HIGH FREQUENCY SIGNALS

(75) Inventors: Guenter Bertsch, Stuttgart; Klaus-Dieter Miosga, Backnang; Siegbert Martin, Oppenweiler, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,434

(22) PCT Filed: Jun. 23, 1999

(86) PCT No.: PCT/DE98/01715

§ 371 Date: May 19, 1999

§ 102(e) Date: May 19, 1999

(30) Foreign Application Priority Data

Dec. 24, 1997 (DE) .............................................. 197 57 892

(51) Int. Cl.[7] .................................................. H02M 1/12

(52) U.S. Cl. ........................... 307/105; 333/202; 333/209

(58) Field of Search ............................ 307/105; 333/204, 333/202, 12; 257/659

(56) References Cited

U.S. PATENT DOCUMENTS 4,796,079 * 1/1989 Hettiger ................................. 333/12
5,365,209 * 11/1994 Ito et al. ............................. 333/202
5,506,553 * 4/1996 Makita et al. ........................ 333/204
5,796,323 * 8/1998 Uchikoba et al. ................... 333/260
5,880,652 * 3/1999 Snel ..................................... 333/204
5,900,796 * 5/1999 Parker .................................... 333/12

FOREIGN PATENT DOCUMENTS 42 41 635 A1 6/1994 (DE) .
WO 92/13371 8/1992 (WO) .

* cited by examiner

*Primary Examiner*—Albert W. Paladini
(74) *Attorney, Agent, or Firm*—Michael J. Striker

(57) ABSTRACT

An arrangement for frequency-selective suppression of high frequency signals is described, with a hollow chamber (11) including at least partially electrically conductive walls (6, 7) and having radiator elements (4, 5), embodied by stripline technology, for coupling the high frequency signals into and out of the hollow chamber (11). At least two radiator elements are present, of which at least one is intended for coupling in the high frequency signals and at least one other is intended for outcoupling them. The at least two radiator elements (4, 5) are embodied on separate substrate faces (2, 3). The separate substrate faces (2, 3) are disposed on a common substrate plate (1), and the hollow chamber is formed by a hood (6), which is disposed on or above the substrate plate (1) in such a way that it covers the radiator elements (4, 5). It is especially advantageous if the hood (6) is integrated with the housing wall (10) of a shielding housing.

11 Claims, 1 Drawing Sheet

ARRANGEMENT FOR FREQUENCY-SELECTIVE SUPPRESSION OF HIGH FREQUENCY SIGNALS

BACKGROUND OF THE INVENTION

1. Field of the Invention

The present invention relates to an arrangement for the frequency-selective suppression of high frequency signals. In particular, it relates to an arrangement for suppressing undesired signal frequencies within a transmitting and/or receiving device.

2. Prior Art

In transmitting and/or receiving devices, to generate or process high frequency signals, auxiliary signals are often needed that are generated with the aid of an oscillator. One example of this is the frequency signal of a receiving oscillator (local oscillator) in a receiving device on the superheterodyne principle. Such auxiliary signals, however, should as a rule not be capable of escaping, or should be capable of escaping only within a narrowly defined frequency range, from the circuit component for which they are needed. To prevent these auxiliary signals from leaving the prospective circuit component, it is known to use shielding baffles, shielding housings, and also filter means as options. The better the suppression of undesired signal frequencies is supposed to be, the greater is the requisite effort and expense, as a rule.

Over the course of technological development in the context of high-frequency technology, increasingly more circuits in microline technology are employed. It is possible in principle also to make filter circuits for suppressing undesired signal frequencies by this technology. However, they often lack the requisite quality, selectivity or selection for complete suppression of undesired signal frequencies. High-frequency filters that have higher quality are known in the form of cavity resonators. It is also known to combine microline technology circuits with such cavity resonators. This makes it possible, even in a component group made by microline technology, to achieve a filter circuit of the highest possible quality. One example of such an arrangement is described in International Patent Disclosure WO 92/13371. This reference relates to an arrangement and a method for coupling a microline circuit to a cavity resonator. The arrangement includes a substrate plate, with the microline circuit provided on one side and the ground plane provided on the other. A cavity resonator is also present. According to this reference, the microline circuit is coupled to the cavity resonator with the aid of a slit, provided in the ground plane, and a planar radiator, which is disposed between the ground plane and the cavity resonator.

Another transition from a microline circuit to, in this case, a hollow conductor is known from German Patent Disclosure DE 42 41 635 Al. Here the microline changes over to a unilateral suspended-substrate line, and a space located above this line on the opposite side of the substrate is widened to a cross section equivalent to the cross section of the adjoining hollow conductor.

In these known couplings, difficulties can arise above all from mechanical strains between the substrate of the microline circuit and the hollow conductor or cavity resonator. These strains are due to different temperature-dependent coefficients of expansion of the different materials. The known couplings are often also difficult to achieve because the assembly and connection of the microline with the cavity resonator must typically be done highly exactly. Another disadvantage that can be named is that in the filter arrangement of WO 92/13371, the high frequency signals to be filtered are coupled in and out via one and the same coupling terminal. It cannot be entirely precluded that at least some undesired high frequency signals will be transmitted directly from the input of the filter arrangement to the output.

SUMMARY OF THE INVENTION

The object of the present invention is to disclose an arrangement of the above generic type which is suited for use in conjunction with microline circuits, has high quality, and at the same time is simple and economical to produce.

According to the invention the arrangement for frequency-selective suppression of high frequency signals at undesired signal frequencies within a transmitting device, a receiving device or a transmitting and receiving device, comprises a common substrate plate; separate substrate faces spaced from each other on the common substrate plate; a hood disposed on or above the common substrate plate to form a hollow chamber between the hood and the common substrate plate, which is bounded by electrically conductive walls; respective coupling terminals for coupling the high frequency signals into and out of the hollow chamber, which are radiator elements embodied by respective striplines, and the hood being arranged on the substrate plate to cover the radiator elements. One radiator element is connected with the transmitting device, receiving device or transmitting and receiving device to couple in the high frequency signals into the hollow chamber and another radiator element is connected with the transmitting device, receiving device or transmitting and receiving device to couple the high frequency signals out of the hollow chamber.

Advantageous modifications and further embodiments are described hereinbelow. The invention can be realized especially advantageously in combination with a housing of a shielding housing, as is shown in an example in FIG. 3. The arrangement of the invention is preferably used in such a case for the frequency-selective coupling in of signal frequencies into the shielding housing and/or the frequency-selective outcoupling of signal frequencies from the shielding housing.

It is an advantage of the invention that with it a filter arrangement for use in a microline circuit is disclosed that has high quality and accordingly is highly suitable for suppressing undesired signal frequencies. It proves to be an advantage that because the substrate faces are disposed separately from one another, both direct-current decoupling and an avoidance of direct overcouplings of surface waves are attained. This contributes substantially to good suppression of undesired signal frequencies. In an advantageous refinement of the arrangement the hood is disposed above the substrate faces without being directly secured to them or with an air gap between it and the substrate faces, mechanical strains, which can arise from different temperature-dependent expansions of the stripline substrate and the hollow chamber, are reliably avoided. The arrangement of the invention is also insensitive in terms of tolerances in assembly and accordingly requires no calibration. The arrangement of the invention is furthermore insensitive in terms of tolerances with regard to the substrate thickness of the stripline circuit. Another particular advantage of the invention is that the substrate or the stripline circuit needs to be machined on only one side. By comparison, in the arrangement of WO 92/13371, for instance, it is necessary to make a slit in the ground plane of the stripline substrate, and thus both sides of the substrate have to be machined. The situation is similar for the transition to the suspended-substrate line of DE 42 41 635 A1. In summary, the stated arrangement can thus be realized simply and economically and is also easy to produce in large scale mass production. A very particular advantage of the invention is obtained if the aforementioned arrangement is integrated with an existing shielding housing. This advantageous feature of the invention is described in further detail in FIG. 3.

BRIEF DESCRIPTION OF THE DRAWING

Exemplary embodiments of the invention will be described below in conjunction with a drawings in which.

DESCRIPTION OF THE PREFERRED EMBODIMENTS

Figure 1:
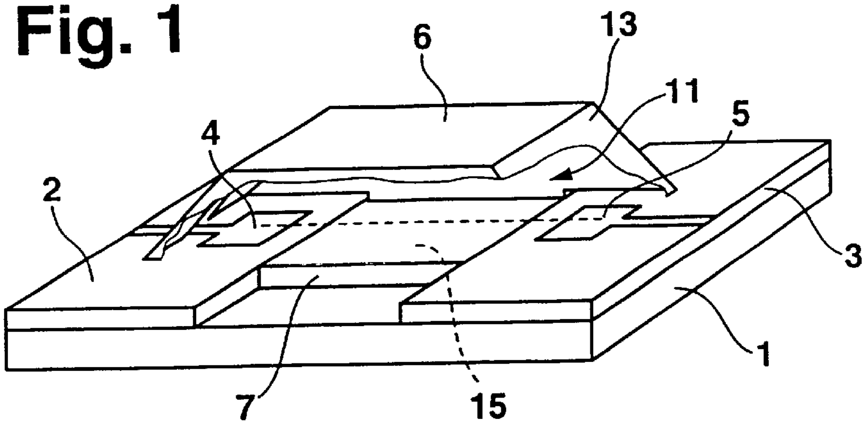
FIG. 1 is a perspective view of the arrangement of the invention, in which a hood is shown in cutaway form.

FIG. 1 shows a perspective view of an arrangement of the invention, in which a hood 6 is shown in cutaway form, for the sake of greater clarity. The hood 6 covers two substrate faces 2 and 3 separated from one another, which are disposed on a common substrate plate 1. Stripline circuits, not shown further here, are located on the substrate faces 2, 3. The substrate plate 1 preferably has an electrically conductive surface, which at the same time is also the ground plane for the stripline circuits, not shown, on the substrate faces 2, 3. There is one coupling terminal 4, 5 made by stripline technology on each of the two substrate faces 2, 3. The coupling terminals operate as radiator or antenna elements and can, as in the present example, be embodied as patch antenna elements, or alternatively for example also as a slot radiator or other radiator elements.

The separate disposition of the substrate faces prevents high frequency signals inside the dielectric of the substrate faces or on their surfaces from being transmitted directly from one coupling terminal to the other. Between the two substrate faces 2, 3, an electrically conductive plate 7 is preferably provided. It fills the space between the substrate faces 2 and 3 that is covered by the hood 6, approximately up to the level of the substrate faces above the substrate plate 1. It serves on the one hand as a bottom face of a hollow chamber 11 formed in conjunction with the hood 6 and to that end is preferably electrically conductively connected with the hood 6. The plate also even more strongly suppresses the transmission from one coupling terminal to the other of surface waves and waves that are propagatable in the dielectric of the substrate faces. The plate 7 also forms a fixed stop for the two substrate faces 2, 3 and thus assures easy assembly, in which the two substrate faces have a defined spacing from one another. In a simpler embodiment, however, the plate 7 may also be lacking; the hood 6 is then preferably electrically conductively connected with the electrically conductive surface of the substrate plate 1. The electrically conductive surface of the substrate plate 1 can also, in addition to the plate 7, be electrically conductively connected with the hood 6.

The hollow chamber 11 acts in a known manner as a cavity resonator, in which high frequency signals can be coupled in and out by means of the coupling terminals 4, 5. Reference numeral 15 indicates an imaginary connecting line between the coupling terminals 4 and 5. Reference numeral 13 indicates a side wall of the hood 6, which in a preferred embodiment of the invention is inclined obliquely above the coupling terminal 5.

Figure 2:
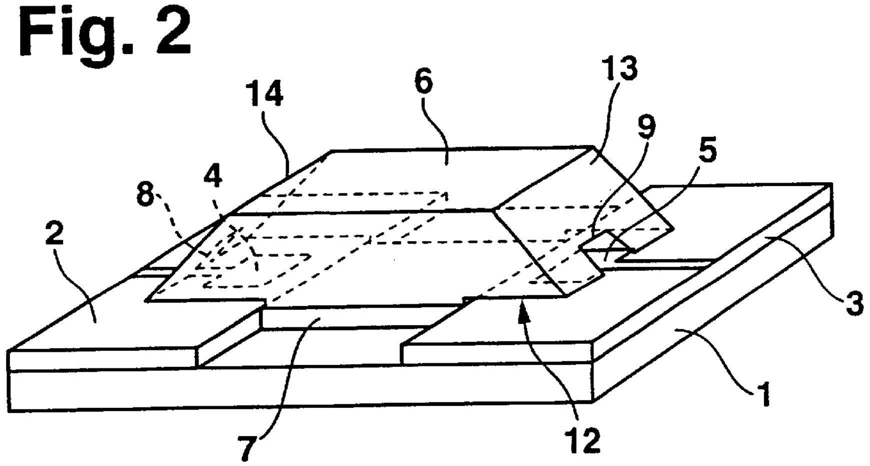
FIG. 2 is a perspective view of the arrangement of the invention, in which the hood is shown as if it were transparent.

FIG. 2 shows the same arrangement as FIG. 1, with the hood 6 now shown as if it were "made of glass". In actuality, however, the hood 6 comprises a conductive material and thus as a rule is not transparent. Along with the elements already designated by reference numeral in FIG. 1, the following additional characteristics can be seen in this view. Reference numeral 14 designates a second side wall of the hood 6, which is inclined in the same way as the side wall 13, but in this case above the coupling terminal 4. The inclined side walls 13, 14 are the side walls of the hood 6, which extend transversely to the imaginary connecting line 15. Reference numerals 8 and 9 designate admission openings in the hood 6, below which lead lines to the coupling terminals 4, 5 are extended. Reference numeral 12 designates an air gap, which in a preferred version of the invention can be present at least in some portions between the hood 6 and the substrate faces 2 and 3 as applicable. The size or width of the air gap 12 is dictated in the assembly of the arrangement by the fact that no mechanical connection or fastening between the hood 6 and the substrate faces 2, 3 is provided. In other words, the hood 6 is disposed above the substrate faces 2, 3 without being directly fastened to them. Because of this characteristic, mechanical strains of the kind already explained at the outset are avoided.

The frequency-selective suppression of the arrangement of the invention is based on the known mode of operation of the cavity resonator. An cavity resonator is known to act as a high-pass filter, in which only frequencies above a limit frequency exist in propagatable form. The limit frequency of the high-pass filter is determined by the geometric dimensions of the hollow chamber 11. By disposing the substrate faces 2, 3 separately from one another, high frequency signals that are supplied to one of the two coupling terminals 4, 5 are also prevented from being transmitted, largely unfiltered, as a wave inside the dielectric of the substrate faces or as a surface wave to the respectively other coupling terminal. This barrier action is reinforced by the preferably installed electrically conductive plate 7.

In the arrangement described here, the coupling terminals are operated as antenna elements. The overcoupling from one coupling terminal 4, 5 to the other of the high frequency signals to be transmitted is reinforced by the obliquely inclined side walls 13, 14, in accordance with the known principles of reflection. The possible air gap 12 between the hood and the substrate can be selected such that production costs are minimized. This pertains above all to the precision of the assembly. The material comprising the hood 6 and the conductive plate 7 or the conductive surface of the substrate plate 1 has the highest possible conductivity, so that ohmic losses of the filter arrangement can be largely minimized.

Figure 3:
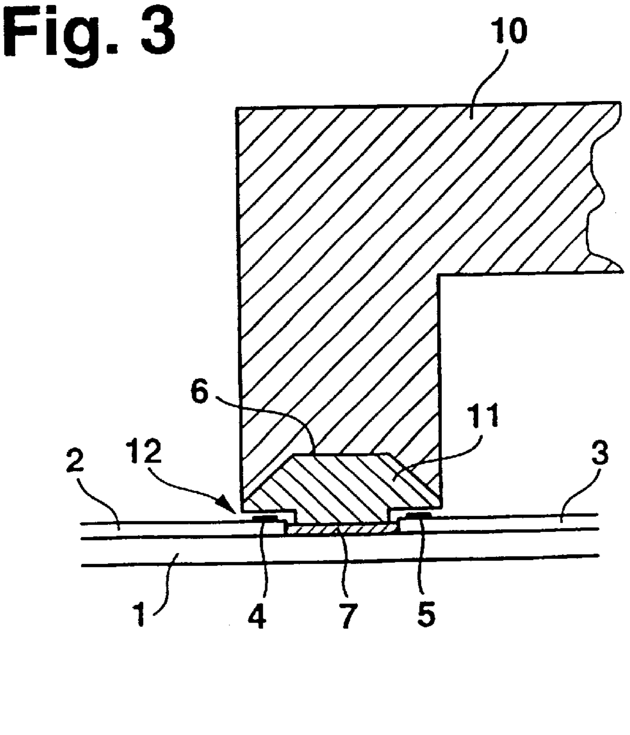
FIG. 3 is a sectional view in which the hood is a component of a housing wall.

FIG. 3 shows an especially advantageous feature of the invention, in which the arrangement of the invention shown in FIGS. 1 and 2 is integrated into a bottom face of a housing wall 10 of a housing. The housing having the housing wall 10 is preferably a shielding housing above a circuit component made by microline technology that is to be shielded. The stripline circuit, not shown, on the substrate face 3 for instance includes an oscillator circuit for generating an auxiliary frequency in a receiver device of a motor vehicle radar system. In a specific application, of this oscillator frequency, only the sixth harmonic is needed. This harmonic is on the order of magnitude of 77 GHz. The fundamental and the lower harmonics should be suppressed or shielded as completely as possible, for the sake of electromagnetic compatability. The arrangement of the invention is now used for outcoupling the required sixth harmonic. In addition to the filtering action of the hollow chamber 11, the oscillator circuit is shielded by the housing with the housing wall 10. The other reference numerals used in FIG. 3 are equivalent to those of FIGS. 1 and 2. Advantageously, in this arrangement, the plate 7 is an integral component of the substrate plate 1 or in other words is connected in one piece to it.

Beyond this preferred exemplary embodiment, however, the described arrangement can also be used in all other cases in which a frequency-selected arrangement in conjunction with striplike circuits is needed. Optionally, the hood 6 is then embodiment in the way shown in FIGS. 1 and 2 and is placed as such above a suitable arrangement of two radiator elements located on separate substrate faces. Depending on the specific conditions involved, the hood 6 may also be mounted in a side face or a top face of a housing wall or only a supporting wall.

What is claimed is:

1. An arrangement for frequency-selective suppression of high frequency signals at undesired signal frequencies within a transmitting device, a receiving device or a transmitting and receiving device, said arrangement comprising a common substrate plate (1);

separate substrate faces (2,3) spaced from each other on the common substrate plate (1);

a hood (6) disposed on or above said common substrate plate (1) to form a hollow chamber (11) between said hood (6) and said common substrate plate (1), said hollow chamber being bounded by electrically conductive walls;

respective coupling terminals (4, 5) for coupling the high frequency signals into and out of the hollow chamber (11), said respective coupling terminals (4,5) being radiator elements embodied by respective striplings and said hood (6) being arranged on said substrate plate (1) to cover said radiator elements;

wherein one of said radiator elements is connected with said transmitting device, said receiving device or said transmitting and receiving device to couple said high frequency signals into the hollow chamber and another of said radiator elements is connected with said transmitting device, said receiving device or said transmitting and receiving device to couple said high frequency signals out of said hollow chamber.

2. The arrangement as defined in claim 1, wherein the substrate plate (1) has an electrically conductive surface, and the hood (6) is electrically conductively connected to the electrically conductive surface of the substrate plate.

3. The arrangement as defined in claim 1, further comprising an electrically conductive plate (7) arranged between the separate substrate faces (2, 3) and wherein the electrically conductive plate (7) is electrically conductively connected to the hood (6).

4. The arrangement as defined in claim 3, wherein the electrically conductive plate (7), up to a height of the substrate faces above the substrate plate (1), largely fills a gap between the separate substrate faces (2, 3).

5. The arrangement as defined in claim 1, wherein the hood (6) is disposed above the substrate faces (2, 3), without being directly secured to them.

6. The arrangement as defined in claim 5, wherein between the hood (6) and the substrate faces (2, 3), an air gap (12) is provided between the hood and the substrate faces in at least some regions.

7. The arrangement as defined in claim 1, wherein the hood (6) has admission openings (8, 9), through which lead lines extended to the radiator elements.

8. The arrangement as defined in claim 1, wherein the hood (6) has side faces (13, 14) which extend transversely to an imaginary connecting line between the radiator elements (4, 5) and which are inclined obliquely above the radiator elements.

9. The arrangement as defined in claim 1, wherein the hood (6) is integrated with a wall (10) of a housing.

10. The arrangement as defined in claim 1, wherein the hood (6) is integrated with a bottom face of a housing wall (10) of a shielding housing.

11. A motor vehicle radar system for suppressing and shielding undesired high frequency signals, said motor vehicle radar system comprising an arrangement for frequency-selective suppression of high frequency signals at undesired signal frequencies within a transmitting device, a receiving device or a transmitting and receiving device, said arrangement comprising:

a common substrate plate (1);

separate substrate faces (2,3) spaced from each other on the common substrate plate (1);

a hood (6) disposed on or above said common substrate plate (1) to form a hollow chamber (11) between said hood (6) and said common substrate plate (1), said hollow chamber being bounded by electrically conductive walls;

respective coupling terminals (4, 5) for coupling the high frequency signals into and out of the hollow chamber (11), said respective coupling terminals (4,5) being radiator elements embodied by respective striplings and said hood (6) being arranged on said substrate plate (1) to cover said radiator elements;

wherein one of said radiator elements is connected with said transmitting device, said receiving device or said transmitting and receiving device to couple said high frequency signals into said hollow chamber and another of said radiator elements is connected with said transmitting device, said receiving device or said transmitting and receiving device to couple said high frequency signals out of said hollow chamber.

* * * * *